(12) United States Patent
Huang et al.

(10) Patent No.: US 12,342,353 B2
(45) Date of Patent: Jun. 24, 2025

(54) CONDITIONAL PHYSICAL DOWNLINK CONTROL CHANNEL (PDCCH) MONITORING

(71) Applicant: Huawei Technologies Co., Ltd., Shenzhen (CN)

(72) Inventors: Wenwen Huang, Shanghai (CN); Xiaolei Tie, Shanghai (CN); Zhanzhan Zhang, Shanghai (CN); Han Zhou, Shanghai (CN); Meng Hua, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 17/891,591

(22) Filed: Aug. 19, 2022

(65) Prior Publication Data
US 2022/0394692 A1 Dec. 8, 2022

Related U.S. Application Data

(63) Continuation of application No. PCT/CN2020/076261, filed on Feb. 21, 2020.

(51) Int. Cl.
*H04W 72/23* (2023.01)
(52) U.S. Cl.
CPC .................. *H04W 72/23* (2023.01)
(58) Field of Classification Search
None
See application file for complete search history.

(56) References Cited

U.S. PATENT DOCUMENTS

| 2016/0198408 | A1 | 7/2016 | Jhang et al. |
| 2021/0029772 | A1* | 1/2021 | Islam ............... H04L 1/1896 |
| 2021/0120577 | A1 | 4/2021 | Jiang et al. |
| 2021/0258107 | A1* | 8/2021 | Khoshnevisan .. H04W 72/0446 |
| 2021/0360528 | A1 | 11/2021 | Cai et al. |

(Continued)

FOREIGN PATENT DOCUMENTS

| CN | 109429258 A | 3/2019 |
| CN | 110719645 A | 1/2020 |
| CN | 110933748 A | 3/2020 |

(Continued)

OTHER PUBLICATIONS

R1-1906524, CMCC, Discussion on PDCCH-based power saving signal/channel design, 3GPP TSG RAN WG1 #97, Reno, USA, May 13-17, 2019, 10 pages.

(Continued)

*Primary Examiner* — Anh Ngoc M Nguyen
(74) *Attorney, Agent, or Firm* — Conley Rose, P.C.

(57) ABSTRACT

A communication transmission method and a device, where the method includes: A terminal device receives first indication information from a network device; and the terminal device skips PDCCH monitoring in a first cell based on the first indication information. The first cell is a single cell; the first cell is a Pcell; the first cell is a Pcell, and at least one Scell of secondary cells Scells in which PDCCH monitoring is skipped when PDCCH monitoring is skipped in the Pcell; or the first cell is a Pcell and all activated Scells of Scells. The method effectively avoids PDCCH-only of the terminal device in the first cell.

20 Claims, 4 Drawing Sheets

(56) References Cited

U.S. PATENT DOCUMENTS

2023/0073156 A1     3/2023   Zhou et al.
2023/0134762 A1*   5/2023   Koskela ................ H04W 24/08
                                                                                               370/329

FOREIGN PATENT DOCUMENTS

| CN | 111277399 A | 6/2020 |
|----|-------------|--------|
| EP | 3836685 A1 | 6/2021 |
| WO | 2020029798 A1 | 2/2020 |

OTHER PUBLICATIONS

R1-1906353, CATT, PDCCH skipping and switching of PDCCH monitoring periodicity, 3GPP TSG RAN WG1 Meeting #97, Reno, USA, May 13-17, 2019, 6 pages.

R1-1904103, vivo, PDCCH-based power saving signal/channel design, 3GPP TSG RAN WG1 #96bis, Xi'an, China, Apr. 8-12, 2019, 7 pages.

* cited by examiner

CONDITIONAL PHYSICAL DOWNLINK CONTROL CHANNEL (PDCCH) MONITORING

CROSS-REFERENCE TO RELATED APPLICATIONS

This is a continuation of International Patent Application No. PCT/CN2020/076261, filed on Feb. 21, 2020, the disclosure of which is hereby incorporated by reference in its entirety.

TECHNICAL FIELD

This application relates to the field of communication technologies, and in particular, to a communication transmission method and a device.

BACKGROUND

In a wireless communication process, more attention is paid to reducing power consumption of a terminal device, to better improve user experience. Currently, an important reason for a waste of power consumption of the terminal device during a PDCCH-only monitoring scheme that exists when the terminal device monitors a physical downlink control channel (PDCCH). To be more specific, a network device does not send control information on the PDCCH, but the terminal device still monitors the PDCCH. The PDCCH is mainly used to carry scheduling information of uplink/downlink data.

As shown in FIG. 1, downlink scheduling is used as an example. A terminal device needs to periodically monitor a PDCCH to obtain scheduling information. If there is scheduling information on the PDCCH, the terminal device receives data on a physical downlink shared channel (PDSCH) based on the scheduling information. However, the network device does not always schedule data to the terminal device, and the terminal device needs to periodically monitor the PDCCH to determine whether there is scheduling. Therefore, when there is no service transmission and no scheduling data between the network device and the terminal device, the terminal device still periodically monitors the PDCCH. In this case, PDCCH-only of the terminal device exists, causing a waste of power consumption. However, there is currently no method for effectively reducing power consumption of the terminal device.

SUMMARY

This application provides a communication transmission method and a device, to effectively reduce power consumption of a terminal device.

According to a first aspect, an embodiment of this application provides a communication transmission method. The method includes the following.

A terminal device receives first indication information from a network device, where the first indication information indicates the terminal device to skip physical downlink control channel (PDCCH) monitoring in a first cell within active time; and the terminal device skips PDCCH monitoring in the first cell based on the first indication information, where the first cell is a single cell for communication between the network device and the terminal device; the first cell is a primary cell (Pcell) for communication between the network device and the terminal device; the first cell is a Pcell for communication between the network device and the terminal device, and at least one secondary cell (Scell) that is of Scells configured by the network device for the terminal device and in which PDCCH monitoring is skipped when PDCCH monitoring is skipped in the Pcell; or the first cell is a Pcell for communication between the network device and the terminal device, and all activated Scells of Scells configured by the network device for the terminal device.

Based on this solution, in this embodiment of the present disclosure, after receiving the first indication information sent by the network device, the terminal device skips PDCCH monitoring in the first cell. This can effectively avoid PDCCH-only of the terminal device in the first cell, and better reduce power consumption of the terminal device. At the same time, in this embodiment of this application, when the first cell includes both the Pcell and the Scell, a mechanism of simultaneously skipping PDCCH monitoring in both the Pcell and the Scell can be implemented. This further effectively reduces power consumption of the terminal device and reduces signaling transmission.

Correspondingly, the terminal device obtains the first indication information from downlink control information (DCI) sent by the network device.

Based on this solution, this embodiment of this application provides a manner in which the network device notifies the terminal device of the first indication information. Adaptability is stronger.

In a possible implementation, the terminal device determines, in the following manner, the at least one Scell in which PDCCH monitoring is skipped when PDCCH monitoring is skipped in the Pcell: The terminal device determines, based on second indication information from the network device, the at least one Scell in which PDCCH monitoring is skipped when PDCCH monitoring is skipped in the Pcell, where the second indication information indicates the at least one Scell in which PDCCH monitoring is skipped when PDCCH monitoring is skipped in the Pcell; or the terminal device determines, based on a binding rule pre-agreed on with the network device, the at least one Scell in which PDCCH monitoring is skipped when PDCCH monitoring is skipped in the Pcell.

Based on this solution, this embodiment of this application provides a plurality of manners of determining the at least one Scell in which PDCCH monitoring is skipped when PDCCH monitoring is skipped in the Pcell.

In a possible implementation, the second indication information includes an Scell group index and/or an index of at least one Scell. The terminal device determines, based on the Scell group index, at least one Scell group in which PDCCH monitoring is skipped when PDCCH monitoring is skipped in the Pcell; and/or the terminal device determines, based on the index of at least one Scell, the at least one Scell in which PDCCH monitoring is skipped when PDCCH monitoring is skipped in the Pcell.

Based on this solution, this embodiment of this application describes a plurality of cases of skipping PDCCH monitoring in both the Pcell and the Scell. For example, PDCCH monitoring is simultaneously skipped in both the Pcell and at least one Scell group. For another example, PDCCH monitoring is simultaneously skipped in both the Pcell and at least one Scell. Content of the first cell is richer and practicability is higher.

In a possible implementation, the first indication information is carried in a bit field newly added to the DCI, or the first indication information is carried in a first indication field in the DCI. The first indication field includes a part or all of the following fields: a secondary cell dormancy indication field, a modulation and coding scheme of transport block 1 field, a new data indicator of transport block 1 field, a redundancy version of transport block 1 field, a hybrid automatic repeat request (HARQ) process number HARQ process number field, an antenna port(s) field, or a DMRS sequence initialization field.

Based on this solution, this embodiment of this application provides a plurality of manners of carrying the first indication information in the DCI. For example, the first indication information is carried in the bit field newly added to the DCI. For another example, the first indication information is carried in the first indication field in the DCI. Information is carried in more manners and practicability is higher.

In a possible implementation, the terminal device obtains the first indication information after determining that a bandwidth part (BWP) indicator field in the DCI indicates a first BWP identifier (ID). A BWP corresponding to the first BWP ID is a dormant BWP, and the dormant BWP is a BWP for which no PDCCH parameter is configured.

Based on this solution, this embodiment of this application describes in detail a manner of carrying the first indication information in the BWP indicator field in the DCI.

In a possible implementation, the first indication information is carried in a first bit in the first indication field in the DCI. The first bit is a bit that is in the first indication field and that corresponds to an Scell in which PDCCH monitoring is simultaneously skipped when PDCCH monitoring is skipped in the Pcell.

In a possible implementation, the DCI further carries third indication information, and the third indication information indicates duration in which the terminal device skips PDCCH monitoring in the first cell.

Based on this solution, in this embodiment of this application, when the terminal device is notified to skip PDCCH monitoring, duration of skipping PDCCH monitoring is further notified.

In a possible implementation, the third indication information is carried in a second indication field in the DCI. The second indication field includes a part or all of the following fields: a secondary cell dormancy indication field, a modulation and coding scheme of transport block 1 field, a new data indicator of transport block 1 field, a redundancy version of transport block 1 field, a HARQ process number field, an antenna port(s) field, or a demodulation reference signal (DMRS) sequence initialization field.

Based on this solution, this embodiment of this application provides a manner of carrying the third indication information.

According to a second aspect, an embodiment of this application further provides a communication transmission method. The method includes the following.

A network device generates first indication information; and the network device sends the first indication information to a terminal device, to indicate, using the first indication information, the terminal device to skip PDCCH monitoring in a first cell within active time. The first indication information indicates the terminal device to skip PDCCH monitoring in the first cell within the active time. The first cell is a single cell for communication between the network device and the terminal device; the first cell is a Pcell for communication between the network device and the terminal device; the first cell is a Pcell for communication between the network device and the terminal device, and at least one Scell that is of Scells configured by the network device for the terminal device and in which PDCCH monitoring is skipped when PDCCH monitoring is skipped in the Pcell; or the first cell is a Pcell for communication between the network device and the terminal device, and all activated Scells of Scells configured by the network device for the terminal device.

Based on this solution, in this embodiment of the present disclosure, after determining that no service transmission with the terminal device is needed, the network device sends the first indication information to the terminal device, such that the terminal device skips PDCCH monitoring in the first cell after receiving the first indication information sent by the network device. This implements PDCCH skipping based on the first cell, and can effectively avoid PDCCH-only of the terminal device in the first cell, and better reduce power consumption of the terminal device. At the same time, in this embodiment of this application, when the first cell includes both the Pcell and the Scell, a mechanism of simultaneously skipping PDCCH monitoring in both the Pcell and the Scell can be implemented. This further effectively reduces power consumption of the terminal device and reduces signaling transmission.

In a possible implementation, the network device notifies the terminal device of the first indication information using DCI sent to the terminal device.

Based on this solution, this embodiment of this application provides a manner in which the network device notifies the terminal device of the first indication information. Adaptability is stronger.

In a possible implementation, before the network device sends the first indication information to the terminal device, the network device determines second indication information, where the second indication information indicates the at least one Scell in which PDCCH monitoring is skipped when PDCCH monitoring is skipped in the Pcell; and the network device sends the second indication information to the terminal device.

Based on this solution, this embodiment of this application provides a manner of determining the at least one Scell in which PDCCH monitoring is skipped when PDCCH monitoring is skipped in the Pcell.

In a possible implementation, the second indication information includes an Scell group index and/or an index of at least one Scell.

Based on this solution, this embodiment of this application describes a plurality of cases of skipping PDCCH monitoring in both the Pcell and the Scell. For example, PDCCH monitoring is simultaneously skipped in both the Pcell and at least one Scell group. For another example, PDCCH monitoring is simultaneously skipped in both the Pcell and at least one Scell. Content of the first cell is richer and practicability is higher.

In a possible implementation, the first indication information is carried in a bit field newly added to the DCI, or the first indication information is carried in a first indication field in the DCI. The first indication field includes a part or all of the following fields: a secondary cell dormancy indication field, a modulation and coding scheme of transport block 1 field, a new data indicator of transport block 1 field, a redundancy version of transport block 1 field, a HARQ process number field, an antenna port(s) field, or a DMRS sequence initialization field.

Based on this solution, a plurality of manners of carrying the first indication information in the DCI are provided. For example, the first indication information is carried in the bit field newly added to the DCI. For another example, the first indication information is carried in the first bit field in the DCI. Information is carried in more manners and practicability is higher.

In a possible implementation, the network device indicates a first BWP ID using a BWP indicator field in the DCI. A BWP corresponding to the first BWP ID is a dormant BWP, and the dormant BWP is a BWP for which no PDCCH parameter is configured.

Based on this solution, this embodiment of this application describes in detail a manner of carrying the first indication information in the BWP indicator field in the DCI.

In a possible implementation, the first indication information is carried in a first bit in the first indication field in the DCI. The first bit is a bit that is in the first indication field and that corresponds to the at least one Scell in which PDCCH monitoring is skipped when PDCCH monitoring is skipped in the Pcell.

In a possible implementation, the network device determines third indication information, where the third indication information indicates duration in which the terminal device skips PDCCH monitoring in the first cell; and the network device sends the third indication information to the terminal device.

Based on this solution, in this embodiment of this application, when the network device notifies the terminal device to skip PDCCH monitoring, duration of skipping PDCCH monitoring is further notified.

In a possible implementation, the network device carries the third indication information in a second indication field in the DCI sent to the terminal device. The second indication field includes a part or all of the following fields: a secondary cell dormancy indication field, a modulation and coding scheme of transport block 1 field, a new data indicator of transport block 1 field, a redundancy version of transport block 1 field, a HARQ process number field, an antenna port(s) field, and a DMRS sequence initialization field.

Based on this solution, this embodiment of this application provides a manner of carrying the third indication information.

According to a third aspect, an embodiment of this application further provides a communication transmission method. The method includes the following.

A terminal device receives first indication information sent by a network device, where the first indication information indicates the terminal device to switch from a current active BWP of a first cell to a dormant BWP within active time; and the terminal device switches from the current active BWP of the first cell to the dormant BWP based on the first indication information. The dormant BWP is a BWP for which no PDCCH parameter is configured. The first cell is a single cell for communication between the network device and the terminal device; the first cell is a Pcell for communication between the network device and the terminal device; the first cell is a Pcell for communication between the network device and the terminal device, and at least one Scell that is of Scells configured by the network device for the terminal device and in which PDCCH monitoring is skipped when PDCCH monitoring is skipped in the Pcell; or the first cell is a Pcell for communication between the network device and the terminal device, and all activated Scells of Scells configured by the network device for the terminal device.

According to a fourth aspect, an embodiment of this application further provides a communication transmission method. The method includes the following.

A network device generates first indication information; and the network device sends the first indication information to a terminal device. The first indication information indicates the terminal device to switch from a current active BWP of a first cell to a dormant BWP within active time. The dormant BWP is a BWP for which no PDCCH parameter is configured. The first cell is a single cell for communication between the network device and the terminal device; the first cell is a Pcell for communication between the network device and the terminal device; the first cell is a Pcell for communication between the network device and the terminal device, and at least one Scell that is of Scells configured by the network device for the terminal device and in which PDCCH monitoring is skipped when PDCCH monitoring is skipped in the Pcell; or the first cell is a Pcell for communication between the network device and the terminal device, and all activated Scells of Scells configured by the network device for the terminal device.

According to a fifth aspect, an embodiment of this application further provides a terminal device. The terminal device may be configured to perform the method in any one of the first aspect or the third aspect, or any possible implementation of the first aspect and the third aspect. For example, the terminal device may include a module or a unit configured to perform each operation in any one of the first aspect or the possible implementations of the first aspect. For example, the terminal device includes a processing unit and a communication unit.

According to a sixth aspect, an embodiment of this application further provides a network device. The network device may be configured to perform the method in any one of the second aspect or the fourth aspect, or any possible implementation of the second aspect and the fourth aspect. For example, the network device may include a module or a unit configured to perform each operation in any one of the second aspect or the possible implementations of the second aspect. For example, the network device includes a processing unit and a communication unit.

According to a seventh aspect, an embodiment of this application further provides a communication system, including the terminal device in the first aspect and the network device in the second aspect; and/or the terminal device in the third aspect and the network device in the fourth aspect.

According to an eighth aspect, an embodiment of this application provides a chip system, including a processor, and optionally, further including a memory. The memory is configured to store a computer program, and the processor is configured to invoke the computer program from the memory and run the computer program, such that a communication device on which the chip system is installed performs the method in any one of the first aspect to the fourth aspect, and/or the communication device on which the chip system is installed performs the method in any possible implementation of the first aspect to the fourth aspect.

According to a ninth aspect, an embodiment of this application provides a computer program product. The computer program product includes computer program code. When the computer program code is executed by a communication unit and a processing unit or a transceiver and a processor of a communication device, the communication device is enabled to perform the method in any one of the first aspect to the fourth aspect, and/or a communication device on which a chip system is installed is enabled to perform the method in any possible implementation of the first aspect to the fourth aspect.

According to a tenth aspect, an embodiment of this application provides a computer-readable storage medium. The computer-readable storage medium stores a program, and the program enables a communication device (for example, a terminal device or a network device) to perform

DESCRIPTION OF EMBODIMENTS

In a wireless communication process, more attention is paid to reducing power consumption of a terminal device, to better improve user experience. Currently, an important reason for a waste of power consumption of the terminal device is PDCCH-only that exists when the terminal device monitors a PDCCH.

Figure 1:
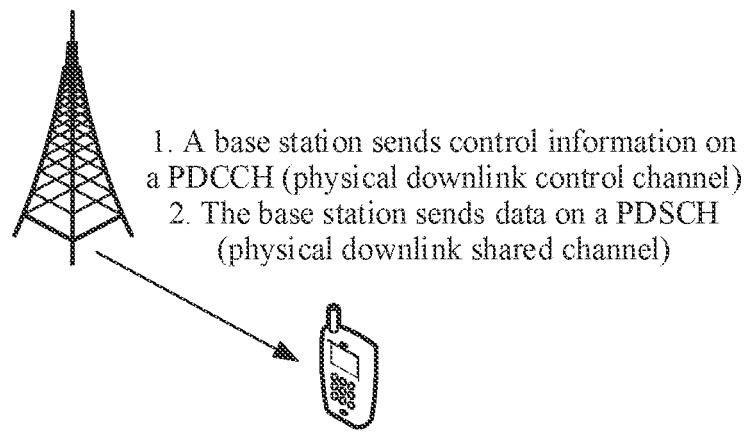
FIG. 1 is a schematic diagram of an existing downlink scheduling scenario according to this application.

As shown in FIG. 1, downlink scheduling is used as an example. A terminal device needs to periodically monitor a PDCCH to obtain scheduling information. If there is scheduling information on the PDCCH, the terminal device receives data on a PDSCH based on the scheduling information. However, a network device does not always schedule data to the terminal device, and the terminal device needs to periodically monitor the PDCCH to determine whether there is scheduling. Therefore, when there is no service transmission and no scheduling data between the network device and the terminal device, the terminal device still periodically monitors the PDCCH. In this case, PDCCH-only of the terminal device exists, causing a waste of power consumption of the terminal device.

An existing solution for reducing power consumption of the terminal device is a secondary cell (Scell) dormancy mechanism. Switching between a dormancy behavior and a non-dormancy behavior of the Scell is implemented through bandwidth part (BWP) switching. When an Scell is indicated as dormancy, the terminal device switches from a current active BWP to a dormant BWP in the Scell, and the terminal device does not need to perform PDCCH monitoring in the dormant BWP. In this way, power consumption of the terminal device is reduced.

Although the Scell dormancy mechanism is proposed in a conventional technology, the terminal device still needs to keep PDCCH monitoring in a primary cell (Pcell). If there is no service transmission, PDCCH monitoring performed by the terminal device in the Pcell also causes a waste of power consumption of the terminal device. In addition, the Pcell and some Scells may share some hardware modules or devices. Even if the Scell is in dormancy, the terminal device still cannot turn off a related module or device to maintain PDCCH monitoring in the Pcell. Therefore, a gain from power consumption saving based on the Scell dormancy mechanism is also lost. In conclusion, there is currently no method for effectively reducing power consumption of the terminal device.

To resolve this problem, an embodiment of this application provides a communication transmission method. The method may be applied to any communication transmission scenario. This embodiment of this application proposes that in a communication transmission process, when there is no service transmission between a network device and a terminal device, the network device indicates the terminal device to skip PDCCH monitoring in a first cell, to effectively reduce power consumption of the terminal device.

It should be noted that the cell in this embodiment of this application may also be described as a carrier. A person skilled in the art should understand that a cell includes a downlink carrier and/or an uplink carrier, a PDCCH is sent on the downlink carrier, and the terminal device performs PDCCH monitoring on the downlink carrier. Therefore, that the terminal device skips PDCCH monitoring in a cell may be equivalent to that the terminal device skips PDCCH monitoring on a downlink carrier of the cell.

In addition, in an optional implementation in this embodiment of this application, the PDCCH on which monitoring is skipped may be only a PDCCH carrying dedicated DCI of the terminal device. To be more specific, after the terminal device is indicated to skip PDCCH monitoring, the terminal device skips monitoring only a PDCCH carrying dedicated DCI of the terminal device, for example, DCI scrambled using a cell radio network temporary identifier (C-RNTI), a modulation and coding scheme (MCS)-C-RNTI, a configured scheduling (CS)-RNTI, or a semi-persistent (SP) channel state information (CSI)-RNTI, and the terminal device may still monitor a PDCCH carrying cell-level DCI or group common DCI. The following describes in detail an example implementation process of embodiments of this application with reference to the accompanying drawings.

First, scenarios to which embodiments of this application may be applied are described. The technical solutions in embodiments of this application may be applied to various communication systems, for example, a Long-Term Evolution (LTE) system, a future 5th generation (5G) system such as a new generation radio access technology (e.g., a new radio (NR) access technology), and a future communication system such as a 6th generation (6G) system.

The 5G system (which may also be referred to as a new radio system) is used as an example. For example, new communication scenarios are defined in the 5G system: ultra-reliable and low-latency communication (URLLC), enhanced mobile broadband (eMBB), and massive machine-type communications (mMTC). These communication scenarios have stricter requirements on communication quality and power consumption reduction. Therefore, it is particularly important to reduce power consumption of a terminal device more effectively in a communication process.

Figure 2:
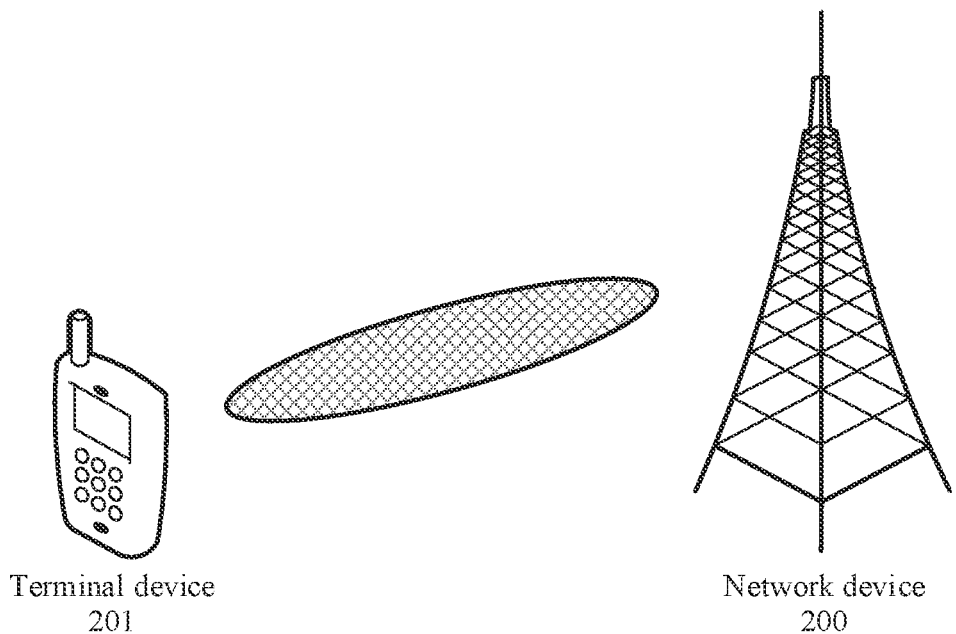
FIG. 2 is a schematic diagram of a communication transmission scenario according to this application.

For ease of understanding embodiments of this application, a communication system shown in FIG. 2 is first used as an example to describe in detail the communication system to which embodiments of this application are applicable. As shown in FIG. 2, the communication system includes a network device 200 and a terminal device 201.

The network device 200 is a device that provides a wireless communication function for the terminal device 201 in the communication system, and can connect the terminal device 201 to a wireless network. The network device 200 may also be referred to as a base station (BS). Currently, some examples of the network device 200 are: a gNodeB (gNB) in 5G, an evolved NodeB (eNB), a radio network controller (RNC), a NodeB (NB), a base station controller (BSC), a base transceiver station (BTS), a home base station (for example, a home evolved nodeB or a home node B (HNB)), a baseband unit (BBU), a transmission reception point (e.g., a transmitting and receiving point (TRP)), a transmitting point (TP), a mobile switching center, and the like.

The terminal device 201 is a device that provides voice and/or data connectivity for a user, and may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal in embodiments of this application may be a mobile phone, a tablet computer (Pad), a computer with a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in smart grid, a wireless terminal in transportation safety, a wireless terminal in smart city, a wireless terminal in smart home, or the like.

A network architecture and a service scenario that are described in this embodiment of this application are intended to describe the technical solutions in this embodiment of this application more clearly, and do not constitute a limitation on the technical solutions provided in this embodiment of this application. A person of ordinary skill in the art may know that, with evolution of the network architecture and emergence of new service scenarios, the technical solutions provided in this embodiment of this application are also applicable to similar technical problems. It should be understood that FIG. 2 is merely a simplified schematic diagram of an example for ease of understanding. The communication system may further include another network device or another terminal device. This is not shown in FIG. 2.

When the communication system in this embodiment of this application performs the communication transmission method, the method performed by the network device 200 in the communication system may be performed by a chip in the network device 200, and the method performed by the terminal device 201 in the communication system may be performed by a chip in the terminal device 201.

Some terms in embodiments of this application are explained and described below for ease of understanding.

(1) A physical downlink control channel (PDCCH) in embodiments of this application is used to carry scheduling and other control information, and is used for at least one or more of the following functions.

a. Sending downlink scheduling information to the terminal device, where the downlink scheduling information is also referred to as downlink assignment information, and the downlink scheduling information includes a transmission parameter of a PDSCH, such that the terminal device receives the PDSCH transmission. The PDSCH is used to carry downlink data sent by the network device to the terminal device.

b. Sending uplink scheduling information to the terminal device, where the uplink scheduling information is also referred to as uplink grant information, and the uplink scheduling information includes a transmission parameter of a PUSCH, such that the terminal device sends the PUSCH to the network device, where the PUSCH is used to carry uplink data sent by the terminal device to the network device.

c. Sending an aperiodic channel quality indicator (CQI) reporting request.

d. Sending an uplink power control command, where the uplink power control command is used by the terminal device to determine transmit power of an uplink channel.

e. Carrying hybrid automatic repeat request (HARQ) related information.

f. Carrying radio network temporary identifier (RNTI) information, where the RNTI information is used to mask a cyclic redundancy check (CRC) and the like, such that when performing CRC, the terminal device determines, based on the RNTI information, whether a PDCCH sent by the network device is sent to the terminal device.

Information carried by the PDCCH may be referred to as downlink control information (DCI). Generally, one type of PDCCH carries DCI in one format scrambled using one type of RNTI. Information carried by the DCI may vary with different DCI formats and/or higher layer signaling (for example, RRC signaling) configurations.

(2) DCI in embodiments of this application may indicate cell-level information, for example, indicate the terminal device to use downlink control information scrambled using a system information (SI)-radio network temporary identifier (SI-RNTI), a paging RNTI (P-RNTI), or a random access (RA)-RNTI (RNTI). The DCI may also indicate terminal device-level information, for example, indicate the terminal device to use downlink control information scrambled using a cell RNTI (C-RNTI), a configured scheduling RNTI (CS-RNTI), a modulation and coding scheme RNTI (C-RNTI or MCS-C-RNTI), or a semi-persistent (SM) CSI RNTI (SP CSI-RNTI). The DCI may also indicate group common information, for example, indicate downlink control information scrambled using a slot format RNTI (e.g., slot format indication (SFI)-RNTI), an interruption RNTI (INT-RNTI), a physical uplink shared channel (PUSCH) transmit power control (TPC) RNTI (TPC-PUSCH-RNTI), a physical uplink control channel (PUCCH) transmit power control RNTI (TPC-PUCCH-RNTI), or a sounding reference symbol (SRS) transmit power control RNTI (TPC-SRS-RNTI).

(3) A physical downlink shared channel (PDSCH) in embodiments of this application is a downlink channel carrying user data. Generally, transmission on the PDSCH is scheduled on the PDCCH.

(4) A BWP in embodiments of this application is referred to as a segment of continuous resource blocks in a cell. A BWP that can be used for actual communication at the same time is referred to as an active BWP. The terminal device communicates with the network device on the active BWP. The active BWP may be switched based on indication using RRC signaling, DCI indication, or when a timer expires. In addition to an initial downlink (DL) BWP or an initial uplink (UL) BWP, a plurality of dedicated DL BWPs and/or a plurality of dedicated UL BWPs may be further configured in a cell. In an example of downlink communication transmission, four dedicated DL BWPs and one initial DL BWP may be configured in a cell. There is one active DL BWP according to a current 3rd Generation Partenership Project (3GPP) specification, but there may be at least one of these DL BWPs in a technology.

The dormant DL BWP in the Scell in embodiments of this application means that when the DL BWP is configured, the terminal device skips monitoring a PDCCH using a default IE PDCCH-Config in RRC signaling configured for the DL BWP. One or no dormant DL BWP may be configured for one Scell, and the dormant DL BWP is configured when at least one DL BWP in which PDCCH monitoring is normally performed is configured through RRC. The terminal device may determine, using RRC configuration signaling, which DL BWP is a dormant DL BWP.

(5) Active time in embodiments of this application is a phase in which the terminal device needs to monitor a PDCCH. In embodiments of this application, the active time may be classified into a plurality of cases, and is not specifically limited to the following cases below.

Case 1: The network device configures a discontinuous reception (DRX) mechanism for the terminal device. A base station semi-statically configures parameters such as a DRX cycle (or a monitoring cycle), DRX duration (e.g., ON-duration), and an inactivity timer for a UE. The UE enables a receiver in an ON-duration phase and an inactivity timer phase to monitor a PDCCH.

An example process is as follows: When DRX is configured, the UE periodically monitors a PDCCH in an ON-duration phase. If the PDCCH has been monitored, the UE sends/receives data based on received scheduling information, and the base station activates an inactivity timer. The UE continues to monitor the PDCCH in an inactivity timer phase until the inactivity timer expires. The UE enters a DRX OFF phase without monitoring the PDCCH. If the PDCCH is not monitored in the ON-duration phase, the UE directly enters DRX OFF. In the DRX mechanism, a phase in which the UE needs to monitor the PDCCH is referred to as active time.

Case 2: The network device does not configure a DRX mechanism for the terminal device. In this case, the terminal device needs to keep periodical PDCCH monitoring. It may be considered that the terminal device is in the active time.

In addition, the terms "system" and "network" in embodiments of this application may be used interchangeably. "At least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be in a singular or plural form. The character "/" usually indicates an "or" relationship between the associated objects. At least one of the following items (pieces) or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

Unless otherwise stated, ordinal numbers such as "first" and "second" mentioned in embodiments of this application are intended to distinguish between a plurality of objects, and not intended to limit an order, a time sequence, priorities, or importance of the plurality of objects. In addition, the terms "include/comprise" and "have" in the embodiments, claims, and accompanying drawings of this application are not exclusive. For example, a process, a method, a system, a product, or a device including a series of steps or modules is not limited to the listed steps or modules, and may further include steps or modules that are not listed.

Based on the descriptions of the foregoing application scenario in embodiments of this application, the following describes a process of reducing power consumption of the terminal device in a communication process.

Figure 3:
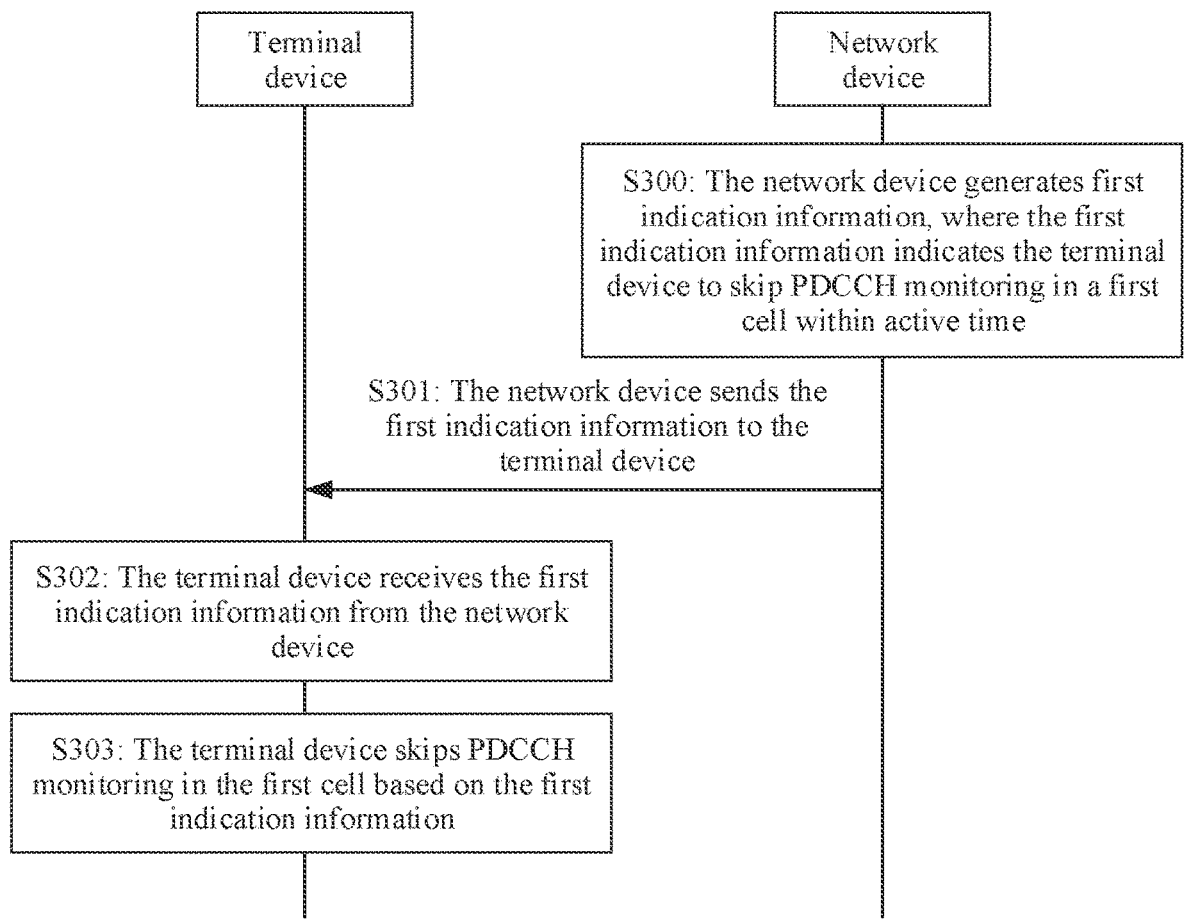
FIG. 3 is a schematic flowchart of a communication transmission method according to this application.

As shown in FIG. 3, an example procedure of a communication transmission method according to an embodiment of this application includes the following steps.

Step 300: A network device generates first indication information. The first indication information indicates a terminal device to skip PDCCH monitoring in a first cell within active time.

In this embodiment of this application, the first cell has the following several cases.

Case 1 of the first cell: The first cell is a single cell (only one cell) for communication between the network device and the terminal device.

For example, if carrier aggregation or dual connectivity of a single base station is not configured for the terminal device, the terminal device has only one cell. In this case, the single cell may also be referred to as a primary cell.

Case 2 of the first cell: The first cell is a Pcell for communication between the network device and the terminal device.

The Pcell is a cell in which an initial connection is set up between the terminal device and the network device, or a cell in which a radio resource control (RRC) connection is reestablished.

Case 3 of the first cell: The first cell is a Pcell for communication between the network device and the terminal device, and at least one Scell that is of Scells configured by the network device for the terminal device and in which PDCCH monitoring is skipped when PDCCH monitoring is skipped in the Pcell. The Scell configured by the network device for the terminal device is added during RRC reconfiguration, and is used to provide an additional radio resource.

In this embodiment of this application, the network device configures the Scell for the terminal device using a first RRC message, such that the terminal device determines the Scell configured by the network device for the terminal device after receiving the first RRC message.

In addition, in this embodiment of this application, the terminal device may determine, in a plurality of manners, the at least one Scell in which PDCCH monitoring is skipped when PDCCH monitoring is skipped in the Pcell. This is not specifically limited to the following manners.

Determining manner 1: The terminal device determines, based on second indication information from the network device, the at least one Scell in which PDCCH monitoring is skipped when PDCCH monitoring is skipped in the Pcell. The second indication information indicates the at least one Scell in which PDCCH monitoring is simultaneously skipped when PDCCH monitoring is skipped in the Pcell.

In this embodiment of this application, the second indication information may be a second RRC message sent by the network device to the terminal device. The second RRC message and the first RRC message may be a same RRC message. For example, the second RRC message is an information element in the first RRC message. Alternatively, the second RRC message and the first RRC message may be different RRC messages.

It should be noted that the second indication information may alternatively be signaling of another type.

In this embodiment of this application, the network device may determine the second indication information in a plurality of manners. For example, the network device itself determines the at least one Scell in which PDCCH monitoring is skipped when PDCCH monitoring is skipped in the Pcell, and generates the second indication information. For another example, before the network device generates the second indication information, the terminal device notifies the network device of at least one Scell that is expected by the terminal device and in which PDCCH monitoring is skipped when PDCCH monitoring is skipped in the Pcell.

The network device may generate the second indication information based on content notified by the terminal device.

Further, the second indication information includes an index of at least one Scell group and/or an index of at least one Scell.

Figure 4:
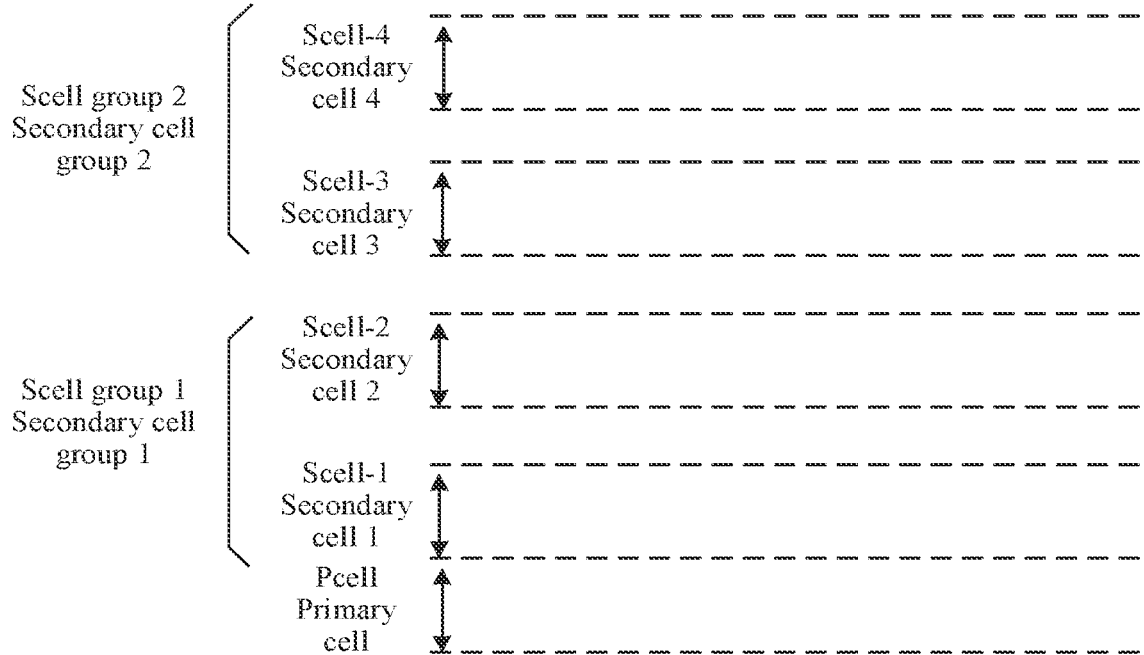
FIG. 4 is a schematic diagram of grouping corresponding Scells by a terminal device according to this application.
Figure 5:
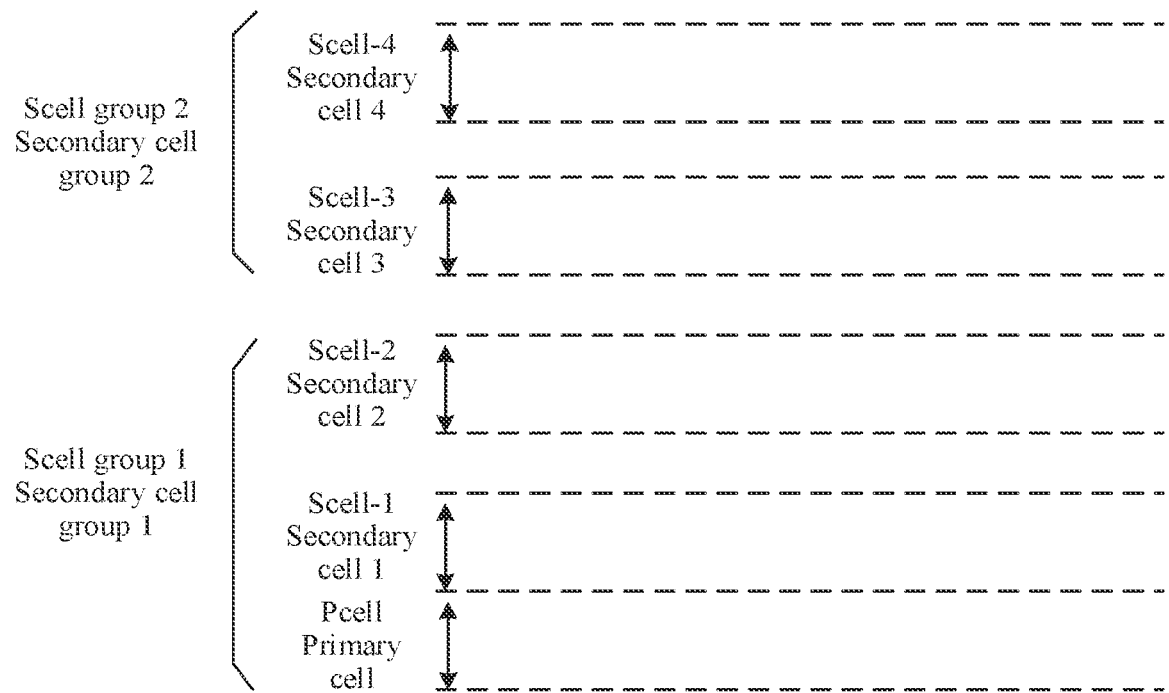
FIG. 5 is a schematic diagram of associating a Pcell with an Scell group 1 according to this application.

For example, it is assumed that four Scells are configured for the terminal device, and the Scells are correspondingly classified into two groups: an Scell group 1 and an Scell group 2. As shown in FIG. 4, the Scell group 1 includes an Scell-1 and an Scell-2, and the Scell group 2 includes an Scell-3 and an Scell-4. It is assumed that the second indication information includes an Scell group index, and the Scell group index is the Scell group 1. As shown in FIG. 5, after receiving the second indication information, the terminal device may determine, based on the Scell group index included in the second indication information, that an Scell in which PDCCH monitoring is simultaneously skipped when PDCCH monitoring is skipped in the Pcell is an Scell in the Scell group 1.

The Scell group 1 includes the Scell-1 and Scell-2. When the second indication information includes the Scell group 1, the terminal device may determine, based on the second indication information, that PDCCH monitoring in the Scell-1 and Scell-2 is simultaneously skipped when PDCCH monitoring is skipped in the Pcell.

For example, it is assumed that Scells configured for the terminal device are an Scell-1 to an Scell-6. It is assumed that the second indication information includes the Scell-2 and Scell-4. After receiving the second indication information, the terminal device may determine, based on the Scell indexes included in the second indication information, that PDCCH monitoring in the Scell-2 and Scell-4 is simultaneously skipped when PDCCH monitoring is skipped in the Pcell.

Determining manner 2: The terminal device determines, based on a binding rule pre-agreed on with the network device, the at least one Scell in which PDCCH monitoring is skipped when PDCCH monitoring is skipped in the Pcell.

For example, it is assumed that the pre-agreed binding rule is as follows.

The terminal device and the network device agree in advance that the at least one Scell in which PDCCH monitoring is skipped when PDCCH monitoring is skipped in the Pcell is an Scell corresponding to a smallest Scell index or an Scell in an Scell group corresponding to a smallest Scell group index. For example, the at least one Scell in which PDCCH monitoring is skipped when PDCCH monitoring is skipped in the Pcell is the Scell-1; or the at least one Scell in which PDCCH monitoring is skipped when PDCCH monitoring is skipped in the Pcell is an Scell in the Scell group 1.

Therefore, the terminal device may determine, based on the pre-agreed binding rule, that the Scell-1 is the at least one Scell in which PDCCH monitoring is skipped when PDCCH monitoring is skipped in the Pcell; or determine that an Scell in the Scell group 1 is the at least one Scell in which PDCCH monitoring is skipped when PDCCH monitoring is skipped in the Pcell.

Case 4 of the first cell: The first cell is a Pcell for communication between the network device and the terminal device, and all activated Scells configured by the network device for the terminal device.

A person skilled in the art may learn that, after the network device configures one or more Scells for the terminal device, the network device may further send Scell activation or deactivation information to the terminal device using MAC CE signaling, or the terminal device deactivates an Scell using a deactivation timer. The terminal device skips PDCCH monitoring in an inactivated Scell. Therefore, in the case 4, the first indication information mainly indicates to skip PDCCH monitoring in the Pcell and in all of the activated Scells, to reduce overheads.

Similarly, for the case 3, the first indication information also mainly indicates to skip PDCCH monitoring in the Pcell and in an activated Scell of the at least one Scell that is configured by or pre-agreed on with the network device and in which PDCCH monitoring is skipped when PDCCH monitoring is skipped in the Pcell.

When the first cell is the cell in the case 3 or case 4, unified adjustment based on the Pcell and the Scell is implemented. For example, the terminal device is indicated to simultaneously skip PDCCH monitoring in the Pcell and/or the Scell, to reduce power consumption of the terminal device. This effectively reduces related adjustment signaling and system overheads.

Step 301: The network device sends the first indication information to the terminal device, to notify, using the first indication information, the terminal device to skip PDCCH monitoring in the first cell within the active time.

In this embodiment of this application, the network device sends the first indication information to the terminal device in DCI, and the DCI carries the first indication information.

Further, in this embodiment of this application, the network device carries the first indication information in the DCI in a plurality of manners. This is not specifically limited to the following several manners.

Carrying manner 1: The first indication information is carried in a bit field that is added to the DCI and that is for skipping PDCCH monitoring in the first cell.

For example, the 3GPP R16 Technical Specification (TS) 38.212 protocol specifies a bit field included in a DCI format. In the carrying manner 1, a new field is added to the DCI format specified in the 3GPP R16 TS38.212 protocol. For example, the new field may be represented as a Pcell PDCCH skipping indicator, and the field carries the first indication information.

In an optional manner of this embodiment of this application, the new field has 1 bit.

Carrying manner 2: A first indication field in the DCI carries the first indication information, and a field in existing DCI in the 3GPP R16 TS38.212 protocol is reused for the first indication field.

Further, in this embodiment of this application, when the first indication information is carried in the first indication field in the DCI, the first indication information is mainly carried in a first bit in the first indication field. In this embodiment of this application. The first bit is a bit that is in the first indication field and that corresponds to the at least one Scell in which PDCCH monitoring is skipped when PDCCH monitoring is skipped in the Pcell.

In this embodiment of this application, several cases in which an existing field in the DCI is reused as the first indication field are selected for description. This is not specifically limited to the following several cases of reuse.

Case 1 of reuse: The first indication field is an Scell dormancy indication (secondary cell dormancy indication) field.

For example, if a network configures x Scell groups using RRC signaling, the Scell dormancy indication field has x bits. Each bit corresponds to one Scell group, and a bit corresponding to one of the Scell groups indicates the first indication information. The Scell group corresponding to the bit that indicates the first indication information is at least one Scell group in which PDCCH monitoring is skipped when PDCCH monitoring is skipped in the Pcell.

When a quantity of the at least one Scell group in which PDCCH monitoring is skipped when PDCCH monitoring is skipped in the Pcell is more than one, the terminal device and the network device may agree in advance on using a bit corresponding to one of the at least one Scell group in which PDCCH monitoring is skipped when PDCCH monitoring is skipped in the Pcell to indicate the first indication information. For example, a bit corresponding to an Scell group that is of the plurality of Scell groups in which PDCCH monitoring is simultaneously skipped when PDCCH monitoring is skipped in the Pcell and that has the largest or smallest Scell group index is used to represent the first indication information.

Case 2 of reuse: The first indication field is a part of bits in the following fields:
 a modulation and coding scheme of transport block 1 field;
 a new data indicator of transport block 1 field;
 a redundancy version of transport block 1 field;
 a HARQ process number field;
 an antenna port(s) field; and
 a DMRS sequence initialization field.

For example, in a 3GPP R16 protocol, the network device may indicate, using the field described in the case 2 of reuse, whether an Scell is in dormancy or non-dormancy. An example indication method is as follows:

A frequency domain resource assignment field in a DCI format 1_1 is set to all 0s (if resourceAllocation is resourceAllocationType0) or all 1s (if resourceAllocation is resourceAllocationType1), and the field described in the case 2 of reuse may indicate whether each Scell is in dormancy or non-dormancy. Each bit in the field described in the case 2 of reuse corresponds to one Scell.

In this embodiment, a bit corresponding to one Scell in the field described in the case 2 of reuse may indicate the first indication information, and the Scell corresponding to the bit that indicates the first indication information is the at least one Scell in which PDCCH monitoring is skipped when PDCCH monitoring is skipped in the Pcell.

When a quantity of the at least one Scell in which PDCCH monitoring is skipped when PDCCH monitoring is skipped in the Pcell is more than one, the terminal device and the network device may agree in advance on using a bit corresponding to one of the at least one Scell in which PDCCH monitoring is skipped when PDCCH monitoring is skipped in the Pcell to indicate the first indication information. For example, a bit corresponding to an Scell that is of the plurality of Scells in which PDCCH monitoring is simultaneously skipped when PDCCH monitoring is skipped in the Pcell and that has the largest or smallest Scell index indicates the first indication information.

Carrying manner 3: A DL BWP indicator field in the DCI indicates the first indication information.

In this embodiment of this application, if there is a DL BWP for which no PDCCH parameter is configured in DL BWPs of the Pcell configured by the network device for the terminal device, the DL BWP may be represented as a Pcell dormant DL BWP.

A person skilled in the art may understand that if an active DL BWP of a cell is a DL BWP for which no PDCCH parameter is configured, the terminal device does not need to perform PDCCH monitoring on the active DL BWP of the cell. Therefore, if the network device notifies the terminal device to switch from a current active DL BWP to a Pcell dormant DL BWP in the Pcell, it means that the terminal device is notified to skip PDCCH monitoring in the first cell.

In the DL BWPs of the Pcell, an identifier of the DL BWP for which no PDCCH parameter is configured is denoted as a first DL BWP ID.

Further, in this embodiment of this application, after the terminal device receives the DCI sent by the network device, if the DL BWP indicator field in the DCI indicates the first BWP ID, the DL BWP indicator field may indicate the terminal device to skip PDCCH monitoring in the first cell. In other words, this is equivalent to that the terminal device receives the first indication information, and skips PDCCH monitoring in the first cell based on the first indication information.

For example, the network device configures two DL BWPs for the terminal device in the Pcell, and DL BWP IDs are 1 and 2. A DL BWP corresponding to DL BWP ID 1 is a DL BWP for which a PDCCH parameter is configured, and a DL BWP corresponding to DL BWP ID 2 is a DL BWP for which no PDCCH parameter is configured. If a current active DL BWP in the Pcell is DL BWP ID 1, the terminal device needs to perform PDCCH monitoring in the Pcell. When the network device needs to notify the terminal device to skip PDCCH monitoring in the first cell, the network device sends the DCI to the terminal device, and a DL BWP indicator field in the DCI indicates DL BWP ID 2.

Correspondingly, after receiving the DCI, the terminal device switches from the DL BWP corresponding to DL BWP ID 1 to the DL BWP corresponding to DL BWP ID 2. On the DL BWP corresponding to the DL BWP ID 2, the terminal device does not need to perform PDCCH monitoring.

In this case, the DL BWP corresponding to DL BWP ID 2 in the Pcell becomes an inactive DL BWP. It may also be understood that the terminal device skips PDCCH monitoring in the Pcell after receiving the DCI. In addition, for the case 3 of the first cell and the case 4 of the first cell, when the terminal device skips PDCCH monitoring in the Pcell, the terminal device also correspondingly skips PDCCH monitoring in an Scell in which PDCCH monitoring is simultaneously skipped when PDCCH monitoring is skipped in the Pcell.

It should be noted that in this embodiment of this application, in addition to the DCI information, the network device may further carry the first indication information in another piece of information sent to the terminal device.

Step 302: The terminal device receives the first indication information from the network device. The first indication information indicates the terminal device to skip PDCCH monitoring in the first cell within the active time.

The following separately describes cases of execution after the terminal device receives the first indication information.

Case 1 of execution: If the first cell is a single cell for communication between the network device and the terminal device, after receiving the first indication information, the terminal device skips PDCCH monitoring in the single cell based on the first indication information.

Case 2 of execution: If the first cell is a Pcell for communication between the network device and the terminal device, after receiving the first indication information, the terminal device skips PDCCH monitoring in the Pcell based on the first indication information. If the terminal device has an activated Scell, the terminal device may still keep PDCCH monitoring in the activated Scell.

Case 3 of execution: If the first cell is a Pcell for communication between the network device and the terminal device, and at least one Scell that is of Scells configured by the network device for the terminal device and in which PDCCH monitoring is skipped when PDCCH monitoring is skipped in the Pcell, after receiving the first indication information, the terminal device skips, based on the first indication information, PDCCH monitoring in the Pcell and the at least one Scell in which PDCCH monitoring is skipped when PDCCH monitoring is skipped in the Pcell.

Case 4 of execution: If the first cell is a Pcell for communication between the network device and the terminal device and all activated Scells, after receiving the first indication information, the terminal device skips PDCCH monitoring in the Pcell and all of the activated Scells based on the first indication information.

Step 303: The terminal device skips PDCCH monitoring in the first cell based on the first indication information.

In this embodiment of this application, there are a plurality of implementations in which the terminal device skips PDCCH monitoring in the first cell based on the first indication information. This is not specifically limited to the following several implementations.

Implementation 1: After receiving the first indication information, the terminal device skips PDCCH monitoring in a current DL BWP in the first cell.

The following describes the implementation 1 in detail.

For example, for a Pcell, it is assumed that an ID of a current active DL BWP is 1. After receiving the first indication information on the active DL BWP, the terminal device does not need to perform DL BWP switching, and continues to work on the DL BWP whose DL BWP ID is 1. However, the terminal device does not need to perform PDCCH monitoring in the Pcell.

In other words, the terminal device needs to perform PDCCH monitoring in the Pcell before receiving the first indication information, and the terminal device skips PDCCH monitoring in the Pcell after receiving the first indication information.

Implementation 2: After receiving the first indication information, the terminal device needs to switch between DL BWPs, to skip PDCCH monitoring.

The following describes the implementation 2 in detail.

For example, for a Pcell, it is assumed that an ID of a current active DL BWP is 1. After receiving the first indication information, the terminal device switches from the active DL BWP whose DL BWP ID is 1 to a DL BWP whose DL BWP ID is 2. The DL BWP whose DL BWP ID is 2 is a dormant DL BWP and PDCCH monitoring is not needed on the dormant DL BWP. This implements PDCCH monitoring skipping in the Pcell.

In this embodiment of this application, content of Implementation 2 may be implemented in a plurality of manners. This is not specifically limited to the following method.

In an optional manner of this embodiment of this application, a dormant DL BWP is configured in the Pcell. After receiving the first indication information, the terminal device switches from a current active DL BWP to a dormant DL BWP in the Pcell.

In addition, in this embodiment of this application, a first non-dormant DL BWP may be further configured in the Pcell as a DL BWP to which the terminal device switches from the dormant DL BWP when PDCCH monitoring is resumed in the Pcell. After switching to the first non-dormant DL BWP, the terminal device resumes PDCCH monitoring in the Pcell.

For example, when resuming PDCCH monitoring in the Pcell, the terminal device switches from the dormant DL BWP to the first non-dormant DL BWP.

In an optional manner in this embodiment of this application, after resuming PDCCH monitoring in the Pcell, the terminal device may alternatively switch from the dormant DL BWP to another DL BWP. For example, the other DL BWP may be an active DL BWP last used before the terminal device switches to the dormant DL BWP.

In an example manner of this embodiment of this application, when the terminal device receives the first indication information and skips PDCCH monitoring in the first cell, duration in which the terminal device skips PDCCH monitoring in the first cell may be further set. Therefore, after the duration of skipping PDCCH monitoring expires, PDCCH monitoring in the first cell is resumed.

For example, it is assumed that the duration is four slots. After receiving the first indication information, the terminal device skips PDCCH monitoring in the first cell and keeps skipping PDCCH monitoring for four consecutive slots. After four slots, the terminal device resumes PDCCH monitoring in the first cell.

The terminal device may determine, in a plurality of manners, the duration of skipping PDCCH monitoring in the first cell. This is not specifically limited to the following manners.

Duration determining manner 1: The network device sends third indication information to the terminal device using the DCI sent to the terminal device. The DCI carries the third indication information, and the third indication information indicates the duration in which the terminal device skips PDCCH monitoring in the first cell.

In this embodiment of this application, when the third indication information is carried in the DCI, there may be the following several cases:

Carrying case 1: The first indication information is carried in the carrying manner 1 and the carrying manner 2 of step 301, and the third indication information is carried in a part or all of bits in a second indication field in the DCI.

In this embodiment of this application, the second indication field is a part or all of the following fields:

a. a secondary cell dormancy indication field;
b. a modulation and coding scheme of transport block 1 field;
c. a new data indicator of transport block 1 field;
d. a redundancy version of transport block 1 field;
e. a HARQ process number field;
f. an antenna port(s) field; and
g. a DMRS sequence initialization field.

For example, the first indication information is carried in the carrying manner 1 of step 301, to indicate to skip PDCCH monitoring in the first cell. The network device may carry the third indication information in a bit that is in the Scell dormancy indication field and that corresponds to the at least one Scell group in which PDCCH monitoring is skipped when PDCCH monitoring is skipped in the Pcell. Alternatively, the third indication information may be carried in a bit that is in the field of the items b to g in the second indication field and that corresponds to the at least one Scell in which PDCCH monitoring is skipped when PDCCH monitoring is skipped in the Pcell.

For example, the first indication information is carried in the carrying manner 1 of step 301, to indicate to skip PDCCH monitoring in the first cell. At the same time, a frequency domain resource assignment field in the DCI is set to all 0s (if resourceAllocation is resourceAllocationType0) or all 1s (if resourceAllocation is resourceAllocationType1). In this case, the network device may carry the third indication information in the field of items b to g in the second indication field.

For example, the first indication information is carried in the carrying manner 2 of step 301, to indicate to skip PDCCH monitoring in the first cell. When a quantity of the at least one Scell group in which PDCCH monitoring is skipped when PDCCH monitoring is skipped in the Pcell is more than one, the network device may carry the third indication information in a bit that is in the Scell dormancy indication field and that corresponds to the at least one Scell group in which PDCCH monitoring is skipped when PDCCH monitoring is skipped in the Pcell.

For example, when the at least one Scell group in which PDCCH monitoring is skipped when PDCCH monitoring is skipped in the Pcell includes an Scell group 1 and an Scell group 2, a bit that is in the Scell dormancy indication field and that corresponds to the Scell group 1 carries the first indication information, and a bit that corresponds to the Scell group 2 carries the third indication information.

For another example, when a quantity of the at least one Scell in which PDCCH monitoring is skipped when PDCCH monitoring is skipped in the Pcell is more than one, the network device may carry the third indication information in a bit that is in the field of the items b to g in the second indication field and that corresponds to the at least one Scell in which PDCCH monitoring is skipped when PDCCH monitoring is skipped in the Pcell. For example, when the at least one Scell in which PDCCH monitoring is skipped when PDCCH monitoring is skipped in the Pcell includes an Scell 1 and Scell 2, a bit that is in the field of the items b to g in the second indication field and that corresponds to the Scell 1 carries the first indication information, and a bit that corresponds to the Scell 2 carries the third indication information.

Duration determining manner 2: In this embodiment of this application, the network device sends a third RRC message to the terminal device, to determine the third indication information. The third RRC message carries the third indication information.

It should be noted that, in this embodiment of this application, the third RRC message may be an RRC message same as the first RRC message and/or the second RRC message, or may be an RRC message different from the first RRC message and the second RRC message.

Duration determining manner 3: The terminal device skips PDCCH monitoring in the first cell based on preset duration.

For example, it is assumed that the preset duration of skipping PDCCH monitoring in the first cell is four slots. After receiving the first indication information sent by the network device, the terminal device skips PDCCH monitoring in the first cell for duration of four slots.

For example, for PDCCH monitoring skipping in the Pcell that is implemented based on DL BWP switching in the implementation 2 of step 303, the duration of skipping PDCCH monitoring in the first cell may be equal to a length of a DL BWP inactivity timer (DL BWP-InactivityTimer) in a timer-based DL BWP switching procedure.

It should be noted that, in this embodiment of this application, the duration in which the terminal device skips PDCCH monitoring in the first cell may be represented in different forms. For example, the duration indicates a time length, the duration indicates a timer, or the duration indicates a counter.

Based on the foregoing description of the solutions in this application, it may be understood that, to implement the foregoing functions, the foregoing devices include corresponding hardware structures and/or software modules for executing the functions. A person skilled in the art should easily be aware that, in combination with the units and algorithm steps in the examples described in embodiments disclosed in this specification, the present disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 6:
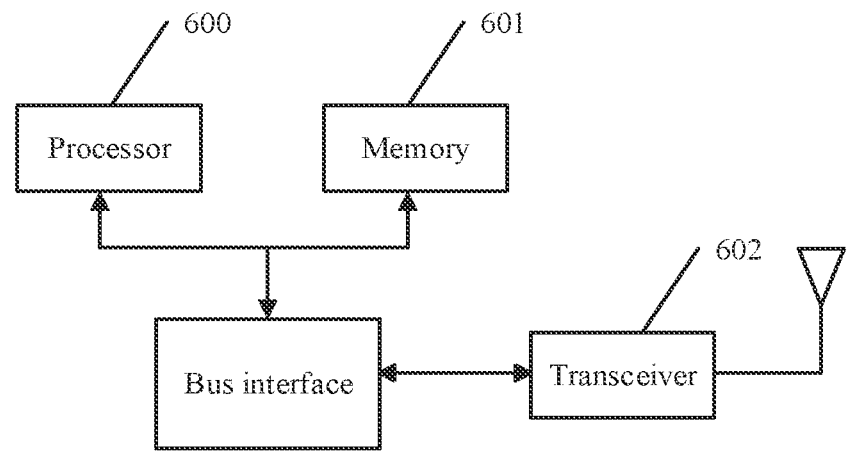
FIG. 6 is a schematic diagram of a terminal device according to this application.

Based on the foregoing embodiments, as shown in FIG. 6, an embodiment of this application further provides a terminal device. The terminal device includes a processor 600, a memory 601, and a transceiver 602.

The processor 600 is responsible for managing bus architecture and general processing. The memory 601 may store data used when the processor 600 performs an operation. The transceiver 602 is configured to receive and send data under control of the processor 600, and perform data communication with the memory 601.

The bus architecture may include any quantity of interconnected buses and bridges. For example, various circuits of one or more processors represented by the processor 600 and various circuits of memories represented by the memory 601 are linked together. The bus architecture may further connect various other circuits such as a peripheral device, a voltage stabilizer, and a power management circuit. These are well known in the art, and therefore are not further described in this specification. A bus interface provides an interface. The processor 600 is responsible for managing bus architecture and general processing. The memory 601 may store data used when the processor 600 performs an operation.

The process disclosed in this embodiment of the present disclosure may be applied to the processor 600, or may be implemented by the processor 600. In an implementation process, steps in a signal processing procedure may be implemented using a hardware integrated logical circuit in the processor 600, or using instructions in a form of software. The processor 600 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of the present disclosure. The general-purpose processor may be a microprocessor, any conventional processor, or the like. The steps of the method disclosed with reference to embodiments of the present disclosure may be directly performed by a hardware processor, or may be performed using a combination of hardware in the processor and a software module. The software module may be located in a mature storage medium in the art, for example, a random-access memory, a flash memory, a read-only memory, a programmable read-only memory, an electrically erasable programmable memory, or a register. The storage medium is located in the memory 601. The processor 600 reads information in the memory 601 and completes the steps of the signal processing procedure in combination with hardware of the processor 600.

For example, the processor 600 is configured to read a program in the memory 601, and perform the method procedure performed by the terminal device in S300 to S303 shown in FIG. 3.

In another method in this embodiment of this application, the processor 600 is configured to read a program in the memory 601 and perform the following content.

The processor 600 receives first indication information sent by a network device, where the first indication information indicates the terminal device to switch from a current active BWP of a first cell to a dormant BWP within active time; and switches from the current active BWP of the first cell to the dormant BWP based on the first indication information. The dormant BWP is a BWP for which no PDCCH parameter is configured. The first cell is a single cell for communication between the network device and the terminal device; the first cell is a Pcell for communication between the network device and the terminal device; the first cell is a Pcell for communication between the network device and the terminal device, and at least one Scell that is of Scells configured by the network device for the terminal device and in which PDCCH monitoring is skipped when PDCCH monitoring is skipped in the Pcell; or the first cell is a Pcell for communication between the network device and the terminal device, and all activated Scells of Scells configured by the network device for the terminal device.

Figure 7:
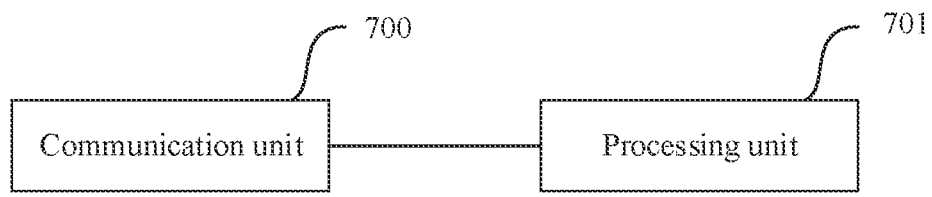
FIG. 7 is a schematic diagram of another terminal device according to this application.

As shown in FIG. 7, the present disclosure provides a communication transmission apparatus. For example, the communication apparatus is the terminal device, and the apparatus includes a communication unit 700 and a processing unit 701.

The communication unit 700 and the processing unit 701 perform the following content.

The communication unit 700 is configured to receive first indication information sent by a network device. The first indication information indicates the terminal device to skip PDCCH monitoring in a first cell within active time.

The processing unit 701 is configured to skip PDCCH monitoring in the first cell based on the first indication information.

The first cell is a single cell for communication between the network device and the terminal device; the first cell is a Pcell for communication between the network device and the terminal device; the first cell is a Pcell for communication between the network device and the terminal device, and at least one Scell that is of Scells configured by the network device for the terminal device and in which PDCCH monitoring is skipped when PDCCH monitoring is skipped in the Pcell; or the first cell is a Pcell for communication between the network device and the terminal device, and all activated Scells of Scells configured by the network device for the terminal device.

In an optional implementation, the processing unit 701 determines, in the following manner, the at least one Scell in which PDCCH monitoring is skipped when PDCCH monitoring is skipped in the Pcell.

The processing unit 701 determines, based on second indication information from the network device, the at least one Scell in which PDCCH monitoring is skipped when PDCCH monitoring is skipped in the Pcell. The second indication information indicates the at least one Scell in which PDCCH monitoring is skipped when PDCCH monitoring is skipped in the Pcell.

Alternatively, the processing unit 701 determines, based on a binding rule pre-agreed on with the network device, the at least one Scell in which PDCCH monitoring is skipped when PDCCH monitoring is skipped in the Pcell.

In an optional implementation, the processing unit 701 is configured to: obtain the first indication information from DCI sent by the network device.

In an optional implementation, the processing unit 701 is configured to: obtain the first indication information after determining that a BWP indicator field in the DCI indicates a first BWP ID.

A BWP corresponding to the first BWP ID is a dormant BWP, and the dormant BWP is a BWP for which no PDCCH parameter is configured.

In an optional implementation, the second indication information includes an Scell group index and/or an index of at least one Scell, and the processing unit 701 is configured to: determine, based on the Scell group index, at least Scell group in which PDCCH monitoring is skipped when PDCCH monitoring is skipped in the Pcell; and/or determine, based on the index of at least one Scell, the at least one Scell in which PDCCH monitoring is skipped when PDCCH monitoring is skipped in the Pcell.

In an optional implementation, the processing unit 701 is configured to: carry the first indication information in a first indication field in the DCI, where the first indication field includes a part or all of the following fields: a secondary cell dormancy indication field, a modulation and coding scheme of transport block 1 field, a new data indicator of transport block 1 field, a redundancy version of transport block 1 field, a HARQ process number field, an antenna port(s) field, and a DMRS sequence initialization field.

In an optional implementation, the DCI received by the terminal device further includes third indication information. The third indication information indicates duration in which the terminal device skips PDCCH monitoring in the first cell.

In a possible implementation, the DCI received by the terminal device includes a second indication field that carries the third indication information. The second indication field includes a part or all of the following fields: a secondary cell dormancy indication field, a modulation and coding scheme of transport block 1 field, a new data indicator of transport block 1 field, a redundancy version of transport block 1 field, a HARQ process number field, an antenna port(s) field, and a DMRS sequence initialization field.

In another method in this embodiment of this application, the communication unit 700 and the processing unit 701 perform the following content.

The communication unit 700 is configured to receive first indication information sent by a network device. The first indication information indicates the terminal device to switch from a current active BWP of a first cell to a dormant BWP within active time.

The processing unit 701 is configured to switch from the current active BWP of the first cell to the dormant BWP based on the first indication information.

The dormant BWP is a BWP for which no PDCCH parameter is configured. The first cell is a single cell for communication between the network device and the terminal device; the first cell is a Pcell for communication between the network device and the terminal device; the first cell is a Pcell for communication between the network device and the terminal device, and at least one Scell that is of Scells configured by the network device for the terminal device and in which PDCCH monitoring is skipped when PDCCH monitoring is skipped in the Pcell; or the first cell is a Pcell for communication between the network device and the terminal device, and all activated Scells of Scells configured by the network device for the terminal device.

Functions of the communication unit 700 and the processing unit 701 shown in FIG. 7 may be executed by the processor 600 by running a program in the memory 601, or may be independently executed by the processor 600.

The communication transmission apparatus shown in FIG. 7 may be the terminal device in the foregoing method embodiments, or may be a chip in the terminal device.

Figure 8:
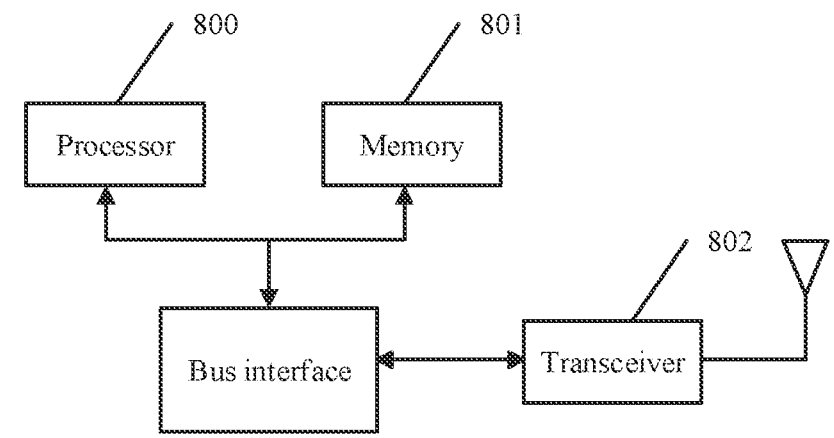
FIG. 8 is a schematic diagram of a network device according to this application.

As shown in FIG. 8, an embodiment of this application further provides a network device. The network device includes a processor 800, a memory 801, and a transceiver 802.

The processor 800 is responsible for managing bus architecture and general processing. The memory 801 may store data used when the processor 800 performs an operation. The transceiver 802 is configured to receive and send data under control of the processor 800, and perform data communication with the memory 801.

The bus architecture may include any quantity of interconnected buses and bridges. For example, various circuits of one or more processors represented by the processor 800 and various circuits of memories represented by the memory 801 are linked together. The bus architecture may further connect various other circuits such as a peripheral device, a voltage stabilizer, and a power management circuit. These are well known in the art, and therefore are not further described in this specification. A bus interface provides an interface. The processor 800 is responsible for managing bus architecture and general processing. The memory 801 may store data used when the processor 800 performs an operation.

The process disclosed in this embodiment of the present disclosure may be applied to the processor 800, or may be implemented by the processor 800. In an implementation process, steps in a signal processing procedure may be implemented using a hardware integrated logical circuit in the processor 800, or using instructions in a form of software. The processor 800 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of the present disclosure. The general-purpose processor may be a microprocessor, any conventional processor, or the like. The steps of the method disclosed with reference to embodiments of the present disclosure may be directly performed by a hardware processor, or may be performed using a combination of hardware in the processor and a software module. The software module may be located in a mature storage medium in the art, for example, a random-access memory, a flash memory, a read-only memory, a programmable read-only memory, an electrically erasable programmable memory, or a register. The storage medium is located in the memory 801. The processor 800 reads information in the memory 801 and completes the steps in the signal processing procedure in combination with hardware of the processor 800.

For example, the processor 800 is configured to read a program in the memory 801, and perform the method procedure performed by the network device in S300 to S303 shown in FIG. 3.

In another method in this embodiment of this application, the processor 800 is configured to read a program in the memory 801 and perform the following content.

The processor 800 generates first indication information, and sends the first indication information to a terminal device. The first indication information indicates the terminal device to switch from a current active BWP of a first cell to a dormant BWP within active time. The dormant BWP is a BWP for which no PDCCH parameter is configured. The first cell is a single cell for communication between the network device and the terminal device; the first cell is a Pcell for communication between the network device and the terminal device; the first cell is a Pcell for communication between the network device and the terminal device, and at least one Scell that is of Scells configured by the network device for the terminal device and in which PDCCH monitoring is skipped when PDCCH monitoring is skipped in the Pcell; or the first cell is a Pcell for communication between the network device and the terminal device, and all activated Scells of Scells configured by the network device for the terminal device.

Figure 9:
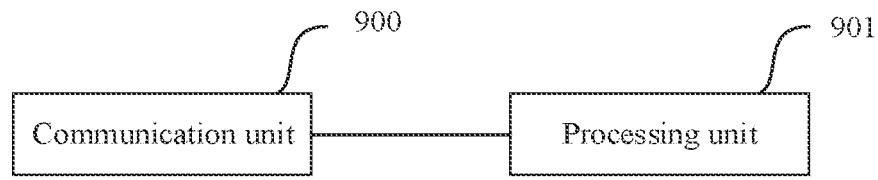
FIG. 9 is a schematic diagram of another network device according to this application.

As shown in FIG. 9, the present disclosure provides a communication transmission apparatus. For example, the communication apparatus is the network device, and the apparatus includes a communication unit 900 and a processing unit 901.

The communication unit 900 and the processing unit 901 perform the following content.

The processing unit 901 is configured to generate first indication information.

The communication unit 900 is configured to send the first indication information to a terminal device, and indicate, using the first indication information, the terminal device to skip PDCCH monitoring in a first cell within active time.

The first indication information indicates the terminal device to skip PDCCH monitoring in the first cell within the active time. The first cell is a single cell configured by the network device for communication between the network device and the terminal device; the first cell is a Pcell for communication between the network device and the terminal device; the first cell is a Pcell configured for communication between the network device and the terminal device, and at least one Scell that is of Scells configured by the network device for the terminal device and in which PDCCH monitoring is skipped when PDCCH monitoring is skipped in the Pcell; or the first cell is a Pcell for communication between the network device and the terminal device, and all activated Scells of Scells configured by the network device for the terminal device.

The communication transmission apparatus shown in FIG. 9 may be the network device in the foregoing method embodiments, or may be a chip in the network device.

In an optional implementation, before sending the first indication information to the terminal device, the processing unit 901 is further configured to: determine second indication information, where the second indication information indicates the at least one Scell in which PDCCH monitoring is skipped when PDCCH monitoring is skipped in the Pcell; and send the second indication information to the terminal device.

In an optional implementation, the communication unit 900 is configured to: notify the terminal device of the first indication information using DCI sent to the terminal device.

In an optional implementation, the second indication information includes an Scell group index and/or an index of at least one Scell.

In an optional implementation, the first indication information is carried in a bit field newly added to the DCI.

In an optional implementation, a first BWP ID is indicated using a BWP indicator field in the DCI. A BWP corresponding to the first BWP ID is a dormant BWP, and the dormant BWP is a BWP for which no PDCCH parameter is configured.

In an optional implementation, the first indication information is carried in a first indication field in the DCI. The first indication field includes a part or all of the following fields: a secondary cell dormancy indication field, a modulation and coding scheme of transport block 1 field, a new data indicator of transport block 1 field, a redundancy version of transport block 1 field, a HARQ process number field, an antenna port(s) field, and a DMRS sequence initialization field.

In an optional implementation, the processing unit 901 is further configured to: determine third indication information, where the third indication information indicates duration in which the terminal device skips PDCCH monitoring in the first cell.

The communication unit 900 is further configured to: send the third indication information to the terminal device.

In an optional implementation, the network device carries the third indication information in a second indication field in the DCI sent to the terminal device. The second indication field includes a part or all of the following fields: a secondary cell dormancy indication field, a modulation and coding scheme of transport block 1 field, a new data indicator of transport block 1 field, a redundancy version of transport block 1 field, a HARQ process number field, an antenna port(s) field, and a DMRS sequence initialization field.

In another method in this embodiment of this application, the communication unit 900 and the processing unit 901 perform the following content.

The processing unit 901 is configured to generate first indication information.

The communication unit 900 is configured to send the first indication information to a terminal device. The first indication information indicates the terminal device to switch from a current active BWP of a first cell to a dormant BWP within active time.

The dormant BWP is a BWP for which no PDCCH parameter is configured.

The first cell is a single cell for communication between the network device and the terminal device; the first cell is a Pcell for communication between the network device and the terminal device; the first cell is a Pcell for communication between the network device and the terminal device, and at least one Scell that is of Scells configured by the network device for the terminal device and in which PDCCH monitoring is skipped when PDCCH monitoring is skipped in the Pcell; or the first cell is a Pcell for communication between the network device and the terminal device, and all activated Scells of Scells configured by the network device for the terminal device.

Functions of the communication unit 900 and the processing unit 901 shown in FIG. 9 may be executed by the processor 800 by running a program in the memory 801, or may be independently executed by the processor 800.

In some possible implementations, aspects of the communication transmission method provided in embodiments of the present disclosure may be further implemented in a form of a program product. The program product includes program code. When the program code is executed on a computer device, the program code is used to enable the computer device to perform the steps in the communication transmission method according to various example implementations of the present disclosure described in this specification.

The program product may be any combination of one or more readable media. The readable medium may be a readable signal medium or a readable storage medium. For example, the readable storage medium may be, but is not limited to, an electrical, magnetic, optical, electromagnetic, infrared, or semiconductor system, apparatus or device, or any combination thereof. More examples (non-exhaustive list) of the readable storage medium include: an electrical connection having one or more conducting wires, a portable disk, a hard disk, a random-access memory (RAM), a read-only memory (ROM), an erasable programmable read-only memory (EPROM), flash memory, an optical fiber, a portable compact disc read-only memory (CD-ROM), an optical storage component, a magnetic storage component, or any appropriate combination thereof.

A program product for performing communication transmission in an implementation of the present disclosure may use a portable compact disc read-only memory (CD-ROM) and include program code, and may run on a server device. However, the program product of the present disclosure is not limited thereto. In this specification, the readable storage medium may be any tangible medium that includes or stores a program, and the program can be transmitted as information, used by an apparatus or a component, or used in combination with an apparatus or a component.

The readable signal medium may include a data signal propagated in a baseband or as a part of a cell, where the data signal carries readable program code. The propagated data signal may be in a plurality of forms, including but not limited to an electromagnetic signal, an optical signal, or any appropriate combination thereof. The readable signal medium may alternatively be any readable medium other than the readable storage medium. The readable medium may send, propagate, or transmit a program used by or in combination with a periodic network action system, apparatus, or device.

The program code included in the readable medium may be transmitted using any appropriate medium, including but not limited to a wireless medium, a wired medium, an optical cable, a radio frequency (RF) medium, or any appropriate combination thereof.

The program code used to execute the operations of the present disclosure may be written in any combination of one or more program design languages. The program design languages include object-oriented program design languages such as Java and C++, and further include a conventional procedural program design language such as a "C" language or a similar program design language. The program code may be completely executed on a user's computing device, partially executed on user equipment, executed as an independent software package, partially executed on a user's computing device and partially executed on a remote computing device, or completely executed on a remote computing device or server. When the program code is executed on the remote computing device, the remote computing device may be connected to the user's computing device using any type of network, including a local area network (LAN) or a wide area network (WAN), or may be connected to an external computing device.

An embodiment of this application further provides a computing device readable storage medium for a communication transmission method performed by a terminal device. That is, content is not lost in a case of power off. The storage medium stores a software program including program code. When the program code is executed on a computing device, any solution for communication transmission in the foregoing embodiments of this application can be implemented when the software program is read and executed by one or more processors.

An embodiment of this application further provides a computing device readable storage medium for a communication transmission method performed by a network device. That is, content is not lost in a case of power off. The storage medium stores a software program including program code. When the program code is executed on a computing device, any solution for network device communication transmission in the foregoing embodiments of this application can be implemented when the software program is read and executed by one or more processors.

The foregoing describes this application with reference to the block diagrams and/or flowcharts of the method, the apparatus (system), and/or the computer program product in embodiments of this application. It should be understood that a block of the block diagrams and/or flowcharts and a combination of blocks of the block diagrams and/or flowcharts can be implemented using computer program instructions. These computer program instructions may be provided to a processor of a general-purpose computer, a processor of a dedicated computer, or another programmable data processing apparatus to produce a machine, such that the instructions executed by the processor of the computer or the other programmable data processing apparatus create a method for implementing an example function/action in the block of the block diagrams and/or flowcharts.

Correspondingly, this application may further be implemented using hardware and/or software (including firmware, resident software, microcode, and the like). Still further, this application may be in a form of a computer program product on a computer-usable or computer-readable storage medium. The computer program product has computer-usable or computer-readable program code implemented in the medium, to be used by an instruction execution system or used in combination with an instruction execution system. In the context of this application, the computer-usable or computer-readable medium may be any medium, and may include, store, communicate, transmit, or transfer a program, to be used by an instruction execution system, apparatus, or device or used in combination with an instruction execution system, apparatus, or device.

Although this application is described with reference to example features and embodiments thereof, it is clear that various modifications and combinations may be made to them without departing from the spirit and scope of this application. Correspondingly, the specification and accompanying drawings are merely example description of this application defined by the accompanying claims, and are considered to have covered any of or all modifications, variations, combinations or equivalents within the scope of this application. It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication transmission method implemented by a terminal device and comprising:
   receiving, from a network device, first indication information instructing the terminal device to skip physical downlink control channel (PDCCH) monitoring in a first cell within an active time;
   determining, by the terminal device, at least one secondary cell (Scell) in which PDCCH monitoring is skipped when PDCCH monitoring is skipped in a primary cell (Pcell) based on second indication information from the network device or a binding rule pre-agreed to with the network device, wherein the second indication information indicates the at least one Scell in which PDCCH monitoring is skipped when PDCCH monitoring is skipped in the Pcell; and
   skipping PDCCH monitoring in the first cell based on the first indication information, wherein the first cell is:
      a single cell for communication between the network device and the terminal device;
      the Pcell for communication between the network device and the terminal device;
      the Pcell, wherein the PDCCH monitoring is skipped in the at least one Scell when the PDCCH monitoring is skipped in the Pcell; or
      the Pcell, wherein the PDCCH monitoring is skipped in all activated Scells when the PDCCH monitoring is skipped in the Pcell.

2. The communication transmission method according to claim 1, wherein receiving the first indication information from the network device comprises obtaining the first indication information from downlink control information (DCI) that is from the network device.

3. The communication transmission method according to claim 2, wherein obtaining the first indication information comprises obtaining the first indication information after determining that a bandwidth part (BWP) indicator field in the DCI indicates a first BWP identifier (ID), and wherein a BWP corresponding to the first BWP ID is a dormant BWP for which no PDCCH parameter is configured.

4. The communication transmission method according to claim 2, wherein the DCI carries the first indication information in a first indication field in the DCI, and wherein the first indication field comprises a part or all of one or more following fields:
   a secondary cell dormancy indication field;
   a modulation and coding scheme of transport block 1 field;
   a new data indicator of transport block 1 field;
   a redundancy version of transport block 1 field;
   a hybrid automatic repeat request (HARQ) process number field;
   an antenna port(s) field; or
   a demodulation reference signal (DMRS) sequence initialization field.

5. The communication transmission method according to claim 2, wherein the DCI further comprises third indication information, and wherein the third indication information indicates a duration in which the terminal device skips PDCCH monitoring in the first cell.

6. The communication transmission method according to claim 5, wherein the DCI further comprises a second indication field that carries the third indication information, and wherein the second indication field comprises a part or all of one or more following fields:
   a secondary cell dormancy indication field;
   a modulation and coding scheme of transport block 1 field;
   a new data indicator of transport block 1 field;
   a redundancy version of transport block 1 field;
   a hybrid automatic repeat request (HARQ) process number field;
   an antenna port(s) field; or
   a demodulation reference signal (DMRS) sequence initialization field.

7. An apparatus comprising:
   at least one memory configured to store instructions; and
   at least one processor coupled to the at least one memory and configured to execute the instructions to cause the apparatus to:
      receive, from a network device, downlink control information (DCI) comprising a bandwidth part (BWP) indicator field and first indication information, wherein the first indication information instructs the apparatus to skip physical downlink control channel (PDCCH) monitoring in a first cell within active time;

make a determination that the BWP indicator field indicates a first BWP identifier (ID), wherein a BWP corresponding to the first BWP ID is a dormant BWP for which no PDCCH parameter is configured;

obtain, after the determination, the first indication information from the DCI; and skip PDCCH monitoring in the first cell based on the first indication information, wherein the first cell is:
a single cell for communication between the network device and the apparatus;
a primary cell (Pcell) for communication between the network device and the apparatus;
the Pcell, wherein the PDCCH monitoring is skipped in at least one secondary cell (Scell) configured by the network device for the apparatus when PDCCH monitoring is skipped in the Pcell; or
the Pcell, wherein all Scells configured by the network device for the apparatus when PDCCH monitoring is skipped in the Pcell.

8. The apparatus according to claim 7, wherein the at least one processor is further configured to execute the instructions to cause the apparatus to determine the at least one Scell in which PDCCH monitoring is skipped when PDCCH monitoring is skipped in the Pcell based on:
second indication information from the network device, wherein the second indication information indicates the at least one Scell in which PDCCH monitoring is skipped when PDCCH monitoring is skipped in the Pcell; or
a binding rule pre-agreed on with the network device.

9. The apparatus according to claim 7, wherein the DCI carries the first indication information in a first indication field in the DCI, and wherein the first indication field comprises a part or all of one or more following fields:
a secondary cell dormancy indication field;
a modulation and coding scheme of transport block 1 field;
a new data indicator of transport block 1 field;
a redundancy version of transport block 1 field;
a hybrid automatic repeat request (HARQ) process number field;
an antenna port(s) field; or
a demodulation reference signal (DMRS) sequence initialization field.

10. The apparatus according to claim 7, wherein the DCI further comprises third indication information, and wherein the third indication information indicates a duration in which the apparatus skips PDCCH monitoring in the first cell.

11. The apparatus according to claim 10, wherein the DCI further comprises a second indication field that carries the third indication information, and wherein the second indication field comprises a part or all of one or more following fields:
a secondary cell dormancy indication field;
a modulation and coding scheme of transport block 1 field;
a new data indicator of transport block 1 field;
a redundancy version of transport block 1 field;
a hybrid automatic repeat request (HARQ) process number field;
an antenna port(s) field; or
a demodulation reference signal (DMRS) sequence initialization field.

12. An apparatus comprising:
at least one memory configured to store instructions; and
at least one processor coupled to the at least one memory and configured to execute the instructions to cause the apparatus to:
determine second indication information indicating at least one secondary cell (Scell) in which physical downlink control channel (PDCCH) monitoring is skipped when PDCCH monitoring is skipped in a primary cell (Pcell);
send the second indication information to a terminal device;
generate first indication information; and
send, to the terminal device, first indication instructing the terminal device to skip PDCCH monitoring in a first cell within an active time, wherein the first cell is:
a single cell for communication between the apparatus and the terminal device;
the Pcell for communication between the apparatus and the terminal device;
the Pcell, wherein the PDCCH monitoring is skipped in the at least one Scell when the PDCCH monitoring is skipped in the Pcell; or
the Pcell, wherein the PDCCH monitoring is skipped in all activated Scells when the PDCCH monitoring is skipped in the Pcell.

13. The apparatus according to claim 12, wherein the at least one processor is further configured to execute the instructions to cause the apparatus to send the first indication information to the terminal device by notifying the terminal device of the first indication information via downlink control information (DCI) sent to the terminal device.

14. The apparatus according to claim 13, wherein notifying the terminal device of the first indication information comprises indicating a first bandwidth part (BWP) identifier (ID) using a BWP indicator field in the DCI, and wherein a BWP corresponding to the first BWP ID is a dormant BWP for which no PDCCH parameter is configured.

15. The apparatus according to claim 13, wherein notifying the terminal device of the first indication information comprises using a first indication field in the DCI to carry the first indication field, wherein the first indication field comprises a part or all of one or more following fields:
a secondary cell dormancy indication field;
a modulation and coding scheme of transport block 1 field;
a new data indicator of transport block 1 field;
a redundancy version of transport block 1 field;
a hybrid automatic repeat request (HARQ) process number field;
an antenna port(s) field; or
a demodulation reference signal (DMRS) sequence initialization field.

16. The apparatus according to claim 13, wherein the at least one processor is further configured to execute the instructions to cause the apparatus to:
determine third indication information, wherein the third indication information indicates a duration in which the terminal device skips PDCCH monitoring in the first cell; and
send the third indication information to the terminal device.

17. The apparatus according to claim 13, wherein the second indication information is a second message, and wherein the first indication information is a first message.

18. The apparatus according to claim 17, wherein the second message and the first message are radio resource control (RRC) messages.

19. The apparatus according to claim 13, wherein the at least one processor is further configured to execute the instructions to cause the apparatus to:
   further send the second indication information in a message; and
   further send the first indication information in the message.

20. The apparatus according to claim 19, wherein the message is a radio resource control (RRC) message.

\* \* \* \* \*